Patented Nov. 20, 1928.

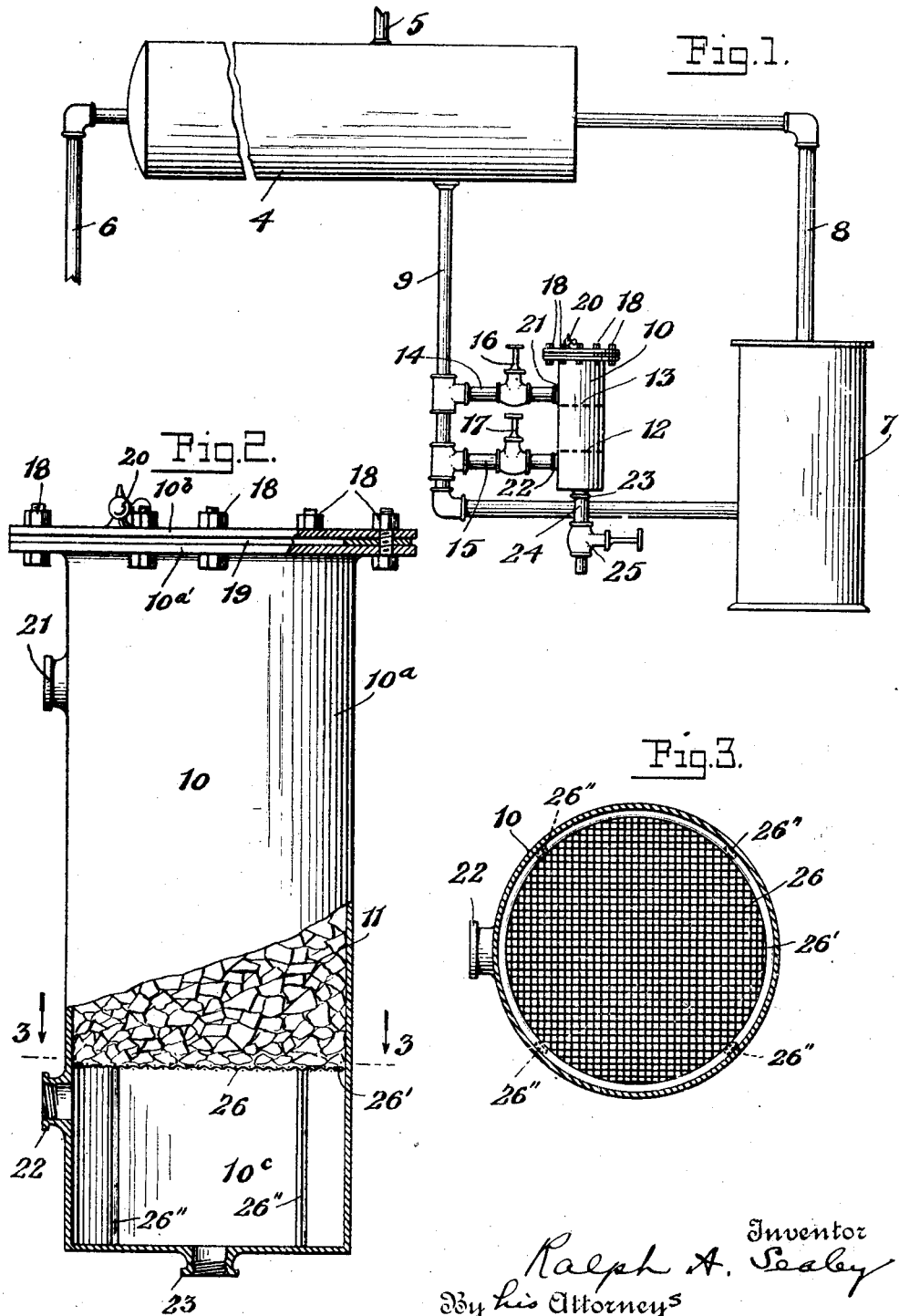

1,692,706

UNITED STATES PATENT OFFICE.

RALPH A. SEALEY, OF NEWARK, NEW JERSEY.

RUST PREVENTION.

Application filed May 18, 1927. Serial No. 192,353.

This invention relates to rust prevention methods, apparatus and devices for water handling systems, as heating systems.

The object of the invention is to provide an improved rust prevention method, apparatus or device for such systems, and one particularly adapted for use in connection with a water heating system, by which is meant a system for heating water to be drained from a part of the system, as from a hot water storage tank, for use exterior to the system.

It has heretofore been suggested to provide in water handling systems, and also in water heating systems, a collection of a suitable material, soluble in water, so that the water circulating in the system will pass through this material, and the material will be taken up by the water and subsequently deposited on interior surfaces of the system to minimize rusting at such surfaces, thus, it was hoped, to minimize, to a satisfactory extent, discoloration of the water drawn off, and also to protect all the plumbing pipes and appliances of the water handling system, whether the system be a house heating system, a hot water supply system or both combined. It has heretofore been thought, however, that said collection of material had to be positioned in the so-called hot water line of a water heating system, in order to obtain the maximum efficiency possible, so far as minimizing rust was concerned.

The present invention, and the advantages thereof as hereinbelow described, are based on my discovery that the collection of water-treating material need not be in said hot water line, and my discovery that when said collection is placed in the cold water line the problem of rust prevention and water discoloration is really properly met. It had previously been thought that placing the collection of material in the hot water line was required in order to utilize the heat in the water to accelerate the dissolving of the material by the water passing through the same. It had also previously been thought that it was necessary to provide a container or receptacle for the material so interposed in the hot water line that the hot water, in flowing through the receptacle and the material therein, had to enter the receptacle at a point below the top layer of said material, and had to leave the receptacle at a point above the bottom layer of said material; in other words, that the receptacle had to be filled with the material to the very top, and to a height above the point of hot water inlet, on the one hand, and that the hot water outlet had to be at the very lowermost point of the receptacle, to which lowermost point the body of material reached, on the other.

I have discovered, however, that if the receptacle be placed in the cold water line, very good results are obtained, and that, if a receptacle thus placed have the cold water enter the receptacle at a point above the top layer of the material and leave said receptacle at a point above the lowermost point of the receptacle, even better results are obtained; where the receptacle is the same size as previously used in the hot water line. That is to say, I have found by test that a receptacle of the same size as heretofore used in the hot water side may be used in the cold water side, and with ideal results, when this same receptacle is only partially filled with the same material as previously employed to completely fill such receptacle when used on the hot water side, even though this of course means that a very much shorter path is provided for the passage of the cold water through the collection of material than previously provided for the hot water.

The apparent explanation is that a comparatively slow rate of dissolving of the material by the water flowing through the system results in a more uniform distribution of the rust-removing and rust-preventing coating inside the system, and the completion of such distribution in a shorter length of time.

Very important advantages follow. In the first place, because the collection of material in the receptacle may be of very small height, the receptacle itself may be comparatively small, and hence easier to install, less conspicuous when installed, and able to be installed in practically all water heating systems already set up. In the second place, the receptacle, although made fairly small, may be of greater height than that of the collection of material therein; in other words, the material may have its top layer below the top of the receptacle, to allow the water inlet to be at a side of the receptacle and at a point below the top thereof, and at the same time to allow the water outlet to be below the bottom layer of the material yet not at the very bottom of the receptacle. Then, since a chamber free of the material will be established at the bottom of the receptacle, opposite the water outlet and of course below the bottom layer of the material, such chamber may act as a trap for the accumulation of impurities and other foreign matter deposited from the water or material or both, and at the same time the bottom of the receptacle, that is, the bottom of this chamber, may be provided with a drain-tube exactly where it should be located. In the third place, there is a chamber at the top of the receptacle, above the top layer of the material and opposite the water inlet, where water on its way to and through the material may accumulate, to maintain a floating crust or foam or froth of impurities, picked up in the system and of light enough specific gravities thus to float; and since the water inlet is thus located at a point other than at the very top of the receptacle, the latter may be provided with a closing plate at the top, for easy removal to clean out such froth, to remove old material, to substitute new material, and to flush out the receptacle by water other than that in the system. During such flushing out of the receptacle, it will of course be understood that the drain tube at the bottom of the receptacle will be opened, as by opening a valve therein; and that the interior of the receptacle will be cut out of the remainder of the system, as by closing valves in the pipes which ordinarily connect up the system with the receptacle. In the fourth place, I have verified by test that the arrangement described, as would, however, be expected, applies, for the first time, an anti-rust coating to the interior of the water boiler or heater, where such coating is particularly important; it being noted in this connection that according to the present invention the collection of rust minimizing material is in the line leading directly to such heater, since it is associated with the cold water side of the system.

The invention will be more clearly understood from the following description of a preferred form of apparatus as shown in the accompanying drawing; which form constitutes a structural embodiment, as well also as a means for facilitating the carrying out of the new method.

While the detailed description to follow is precise as to shapes, and also as to details of certain elements, it should be understood that these shapes are merely illustrative and represent a recitation of shapes as employed in actual tests, and that these element details represent primarily present preferences. The scope of protection contemplated, of course, is to be taken solely from the appended claims.

In said drawing:

Fig. 1 is a schematic view of a water heating system arranged for operation according to the invention, and including a form of receptacle according to the invention;

Fig. 2 is an enlarged view, partially broken away and in section, of the receptacle shown in Fig. 1; and Fig. 3 is a horizontal section, taken on line 3—3 of Fig. 2.

Similar reference characters refer to similar parts throughout the several views of the drawing.

Referring to Fig. 1, a typical system is shown, including a hot water tank or container 4, a hot water riser 5 therefrom, a cold water line 6 therefrom, a heater 7 of any suitable type, a hot water line 8 between the heater and the tank, and a cold water line 9 running back to the heater.

A suitable receptacle for the material to be dissolved is indicated at 10, said material being deposited therein (as indicated at 11 in Fig. 2) between the levels 12 and 13.

Receptacle 10 is not here shown as interposed directly in the cold water line 9, although possibly it might be; but is located in a shunt or by-pass by virtue of the provision of branch pipes 14 and 15, in the former of which is a valve 16, and in the latter of which is a valve 17. These valves are preferably gate valves, so as to avoid valves having washers or the like of a material subject to deterioration by the material 11. When the receptacle is thus associated with the cold water line, that is, is not interposed directly in the cold water line, water may continue to circulate through the system at such times as the receptacle 10 is cut out of the system, as by closing both valves 16 and 17.

Referring now also to Figs. 2 and 3, the receptacle 10 is seen to be of cylindrical formation, vertically elongated, and consisting of a main body 10$^a$, and a removable cap or top-cover plate 10$^b$. This cap may be secured and held down in a tight manner against the top flange 10$^{a'}$ of the main body, as by a circumferential series of bolts 18 and an annular gasket of rubber or the like as indicated at 19.

The cover plate 10$^b$ in the present case carries, as a means for venting the receptacle, a pet-cock 20.

In addition to this venting means, the receptacle 10 has three main openings, all here shown as presented by the main body 10$^a$.

One of these openings, that indicated at 21, is the cold water inlet, and is provided within a neck-connection to be coupled up as shown in Fig. 1 to the pipe 14.

Another of said openings, that indicated at 22, is the cold water outlet, and is provided within a neck-connection to be coupled up as shown in Fig. 1 to the pipe 15.

The third of said openings, that indicated at 23, is within a neck-connection adapted to take a drain-pipe as shown at 24 in Fig. 1, carrying a suitable drain-off valve 25.

At the level of the indication 12 of Fig. 1, there is set in the main body 10$^a$ of the receptacle a preferably removable floor or screen as shown at 26 in Figs. 2 and 3. This screen may be suitably held in place in any way desired, but it is here shown as comprising a circular sheet of ¼″ wire mesh secured within a circular metal rim 26′ carrying four strip-metal depending legs 26″ spaced around the rim and to have their bottoms rest on the bottom of the receptacle.

The material 11 is piled up within the receptacle 10, above the screen 26, to a level such as that indicated at 13 in Fig. 1, as already explained.

Thus, with the receptacle supplied with its charge of material, and the cover plate then secured in place, and the valves 16 and 17 open and the valve 25 closed, water circulating through the cold water line 9, passes into the receptacle, fills the chamber established in the receptacle above the top layer 13 of the material 11, percolates through such material, fills the chamber established in the receptacle below the screen 26, such chamber being indicated at 10$^c$ in Fig. 2, and passes back into the cold water line through pipe 15.

If a very slow rate of take-up of the material 11 by the circulating water is desired, that is, even a slower rate than provided by the apparatus described when the valves 16 and 17 are both fully open, this rate may be decelerated by partially closing one or both of said valves.

At suitable intervals, accumulated sediment may be instantly removed from the chamber 10$^c$, and without necessarily having to remove the cap-plate 10$^b$; by closing the valve 17, or by closing both the valves 16 and 17, and opening the drain valve 25 and the vent means 20.

The cap-plate 10$^b$ may, however, be removed merely by removing the bolts 18. Of course, before this is done, the valves 16 and 17 will be closed, to prevent flooding. Then surface scum may be scooped off. Then, also, the whole contents of the receptacle may be cleansed by draining off all water, through the valve 25, opened for the purpose. Then, also, the contents of the receptacle may be thoroughly flushed out, whenever desired, as when constituting a new charge of material 11; by pouring in a suitable quantity of clean water while said valve 25 is open.

Also, whenever the cap 10$^b$ is removed, the entire width of the interior of the receptacle is opened up, for easy and quick picking or spooning out of any material 11 left on the screen 26, when it is desired to substitute another charge of material. A foraminous bag for each charge of material need not be employed, as would be the case where the receptacle is filled from top to bottom with the material; thus reducing the supplies-expense for up-keep.

The method of the invention should be clear from the foregoing; involving, as it does, the steps of providing a quantity or collection of rust preventing material soluble in water, and interposing this material in the cold water line of a heating system for water; while preferably confining and guiding the cold water in the vicinity of said collection so that the water after leaving said collection is accumulated in a body therebelow for depositing at the bottom of said body, and for readily draining off the sediment that would otherwise be carried into the system, or that else would render the system inoperative by clogging up the same; while also, preferably, confining and guiding the cold water in the vicinity of said collection so that said water on its way to the collection is pooled thereabove for accumulating a surface froth at a point readily accessible for removal.

Inasmuch as many changes could be made in the above constructions, and many apparently widely varying carryings out of the invention could be practiced without departing from the scope thereof, it is intended that all matter contained in the above description or shown in the accompanying drawings shall be interpreted as illustrative and not in a limiting sense.

It is also to be understood that the language contained in the following claim is intended to cover all the generic and specific features of the invention herein described, and all statements of the scope of the invention which, as a matter of language, might be said to fall therebetween.

I claim:

In a water handling system, the combination of a water heater, a hot water container, a hot water line from the heater to said container, a cold water line from said container back to the heater, a receptacle for a rust minimizing material, a valved connection from said cold water line to a point on said receptacle, a valved connection from a lower point on said receptacle back to said cold water line, and a drain connection from still a lower point on said receptacle, there being within said receptacle a perforate means for supporting said material to hold the bottom level thereof above the valved connection from the receptacle to the cold water line.

RALPH A. SEALEY.